United States Patent
Nichols et al.

(10) Patent No.: US 7,363,172 B2
(45) Date of Patent: Apr. 22, 2008

(54) METHOD AND APPARATUS FOR DETECTING DAMAGE IN STRUCTURES

(75) Inventors: Jonathan Nichols, Crofton, MD (US); Mark Seaver, Burtonsville, MD (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/620,177

(22) Filed: Jan. 5, 2007

(65) Prior Publication Data

US 2007/0168341 A1    Jul. 19, 2007

Related U.S. Application Data

(60) Provisional application No. 60/756,621, filed on Jan. 5, 2006.

(51) Int. Cl.
  *G06F 19/00*   (2006.01)
  *G06F 11/30*   (2006.01)
(52) U.S. Cl. ......................................... 702/35; 702/185
(58) Field of Classification Search ................. 702/34, 702/35, 79, 176, 179, 185, 187
See application file for complete search history.

(56) References Cited

U.S. PATENT DOCUMENTS 6,567,752 B2 *  5/2003  Cusumano et al. ........... 702/34
6,635,872 B2 * 10/2003  Davidson ................... 250/307

* cited by examiner

*Primary Examiner*—Bryan Bui
(74) *Attorney, Agent, or Firm*—John J. Karasek; Suresh Koshy

(57) ABSTRACT

A method including providing time series structural response data from a structure. A plurality of linear surrogate data series is generated from the time series structural response data. A first generalized correlation function is estimated for each linear surrogate data series of the plurality of linear surrogate data series to generate a confidence interval. The same correlation function is estimated for the time series structural response data. The output of the generalized correlation function applied to the structural response data is compared to the confidence interval. A damage-induced nonlinearity in the structure is indicated when the output of the generalized correlation function applied to the structural response data is outside of the confidence interval.

8 Claims, 2 Drawing Sheets

METHOD AND APPARATUS FOR DETECTING DAMAGE IN STRUCTURES

CROSS-REFERENCE TO RELATED APPLICATION

This application claims priority to U.S. Provisional Patent Application Ser. No. 60/756,621, filed Jan. 5, 2006, entitled "TECHNIQUE FOR DETECTING DAMAGE-INDUCED NONLINEARITIES IN STRUCTURES IN THE ABSENCE OF BASELINE DATA," to Nichols et al.

TECHNICAL FIELD

This invention relates generally to a method and apparatus for vibration-based structural health monitoring, and, more particularly, to a method and apparatus for detecting damage-induced nonlinearities in structures.

BACKGROUND ART

The field of vibration-based structural health monitoring involves recording a structure's dynamic response to applied or ambient excitation and then extracting damage-induced signatures from the data. These features (e.g., modal properties) are then tracked as damage is incurred to the structure. By continually comparing newly acquired features to a baseline set, ideally extracted from a healthy (or unimpaired) structure, the practitioner makes confidence-based judgments as to whether the structure is damaged. The main problem with this approach is that variations in feature values due to effects other than damage, e.g., temperature and humidity will frequently "mask" damage-induced changes.

Damage in structures often manifests itself as a nonlinearity while most "healthy" structures are well described by a linear model. Detecting damage-induced nonlinearities in structural response data is therefore an effective damage detection strategy. Many of the commonly used approaches in damage detection, however, were designed for analyzing linear system dynamics. In a statistical sense, these approaches make the assumption that the covariance matrix captures the necessary dynamical relationships (correlations) among the data. The linear auto- and cross-correlation functions, the auto- and cross-spectral densities (by the Weiner-Khinchine relationship), and the frequency response function are defined by second-order statistics. These algorithms comprise traditional modal analysis and are ideal if the system being studied is accurately described by a linear mode. Indeed, for linear systems, the auto- and cross-spectral densities sufficiently described the dynamical relationship(s) among the data.

For nonlinear systems, where higher-order correlations become important, these tools are not well suited. Nonetheless, traditional modal analysis can be adapted to account for nonlinearity. See e.g., Worden K. et al., 2001 Nonlinearity in experimental modal analysis, Philosophical Transactions of the Royal Society of London—Series A, vol. 359, pp. 113-130, incorporated herein by reference. For example, if the form of the nonlinearity is known a priori the practitioner might look for specific frequency domain 'distortions'. Similarly, if baseline data have been collected with the structure in a known (or assumed) linear state, subsequently collected data may be analyzed for the appearance of additional poles in the frequency domain, the assumption being that the changes are due to the presence of a nonlinearity. Perhaps the most straightforward approach is to apply variable amplitude loading and check the frequency response for dependences on the level of excitation. This approach was employed by Neild et al. in looking for damage in concrete beams. See e.g., Neild et al., 2003 Nonlinear vibration characteristics of damaged concrete beams, Journal of Structural Engineering, vol. 129, pp. 260-268, incorporated herein by reference. For complex structures, an accurate model of the nonlinearity may be difficult to acquire, and without such a model, it may not be readily apparent what nonlinear feature to expect. Furthermore, many situations call for the practitioner to retro-fit an existing structure (no baseline data present). Exciting a structure with variable amplitude inputs may pose further practical challenges.

DISCLOSURE OF THE INVENTION

An embodiment of the invention includes a method including providing original structural response data from a structure. Surrogate data including a plurality of linear statistical properties of the original structural response data is generated. A plurality of time-delayed entropies is computed from the original structural response data and a plurality of time-delayed entropies from the surrogate data. A damage-induced non-linearity in the structure is identified from a difference between the plurality of time-delayed entropies from the original structural response data and the plurality of time-delayed entropies from the surrogate data. Optionally, the generating comprises phase randomizing the original structural response data and preserving the linear auto-correlations, linear cross-correlations, and amplitude distribution.

An embodiment of the invention includes a method including providing time series structural response data from a structure. A plurality of linear surrogate data series is generated from the time series structural response data. A first generalized correlation function is estimated for each linear surrogate data series of the plurality of linear surrogate data series to generate a confidence interval. The correlation function is also estimated for the original time series structural response data. The output is then compared to the confidence interval. A damage-induced nonlinearity in the structure is indicated when the output of the correlation function applied to the original data is outside of the confidence interval. Optionally, in this embodiment, the correlation function includes a time-delayed transfer entropy function, a bispectrum, a nonlinear prediction error function, or a time-delayed mutual information function. Optionally, the generating comprises phase randomizing the original structural response data and preserving linear auto-correlations, linear cross-correlations, and/or amplitude distribution.

Another embodiment of the invention includes an apparatus. The apparatus includes a first portion operable to receive time series structural response data from a structure. The apparatus includes a second portion operable to generate a plurality of linear surrogate data series from the time series structural response data. The apparatus includes a third portion operable to estimate a generalized correlation function for each linear surrogate data series of the plurality of linear surrogate data series to generate a confidence interval. The apparatus includes a fourth portion operable to estimate the correlation function for the original time series structural response data. The apparatus includes a fifth portion operable to compare this estimate to the confidence interval. The apparatus includes a sixth portion operable to indicate a damage-induced nonlinearity in the structure when the output of the correlation function applied to the original data is outside of the confidence interval. Optionally, the correlation function includes a time-delayed transfer entropy function, a bispectrum, a nonlinear prediction error function, or a time-delayed mutual information function. Optionally, the second portion is operable to phrase randomize the original structural response data and preserving linear auto-correlations, linear cross-correlations, and/or amplitude distribution.

An embodiment of the invention combines advances in sensing and data analysis to produce an automated system operable to detect damage without requiring visual inspection. For example, the embodiment includes a fiber-based system that uses signal analysis to detect impact damage in composites.

An embodiment of the invention obviates the need for explicitly recording a baseline data set, wherein the surrogates serve as a baseline, allowing for an absolute measure of nonlinearity as opposed to a relative tone. Such an embodiment optionally eliminates variability associated with experimental set-up, sensor drift, and/or global temperature changes from being interpreted as damage in the cases where such changes do not introduce a nonlinearity into the system.

BEST MODES OF CARRYING OUT THE INVENTION

Figure 1:
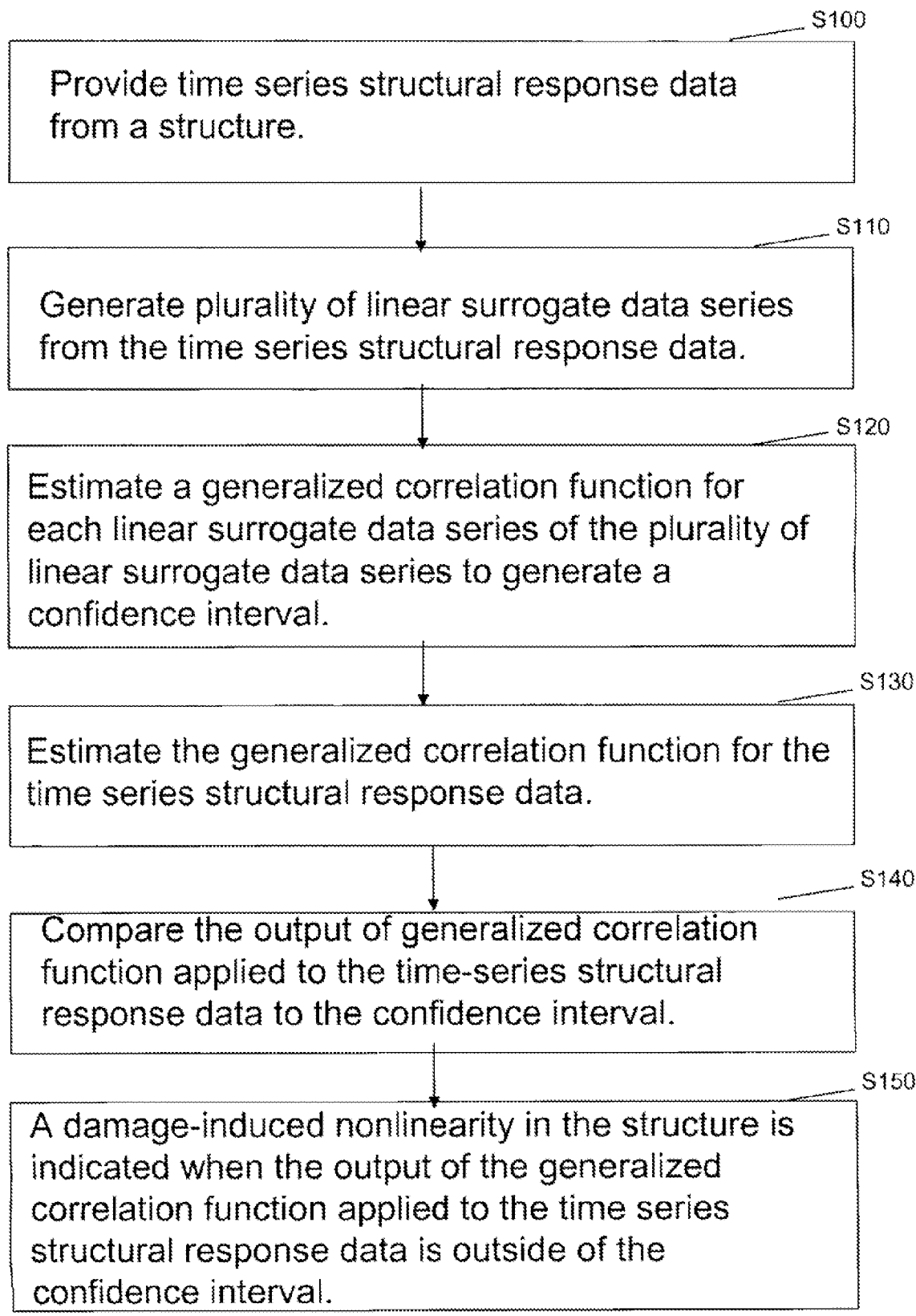
FIG. 1 is a flow chart of a method according to an embodiment of the invention.

An embodiment of the invention, shown by way of illustration in FIG. 1, includes a method including providing time series structural response data from a structure, in Step S100. A plurality of linear surrogate data series is generated from the time series structural response data, in Step S110. A generalized correlation function is estimated for each linear surrogate data series of the plurality of linear surrogate data series to generate a confidence interval, in Step S120. The generalized correlation function is then estimated for the time series structural response data, in Step S130. The result of applying the generalized correlation function to the original data is compared to the confidence interval, in Step S140. A damage-induced nonlinearity in the structure is indicated when the output of the generalized correlation function acting on the original data is outside of the confidence interval, in Step S150. Optionally, in this embodiment, the generalized correlation function includes a time-delayed transfer entropy function, a bispectrum, a nonlinear prediction error function, or a time-delayed mutual information function. Optionally, the generating comprises phase randomizing the original structural response data and preserving linear auto-correlations, linear cross-correlations, and/or amplitude distribution.

Figure 2:
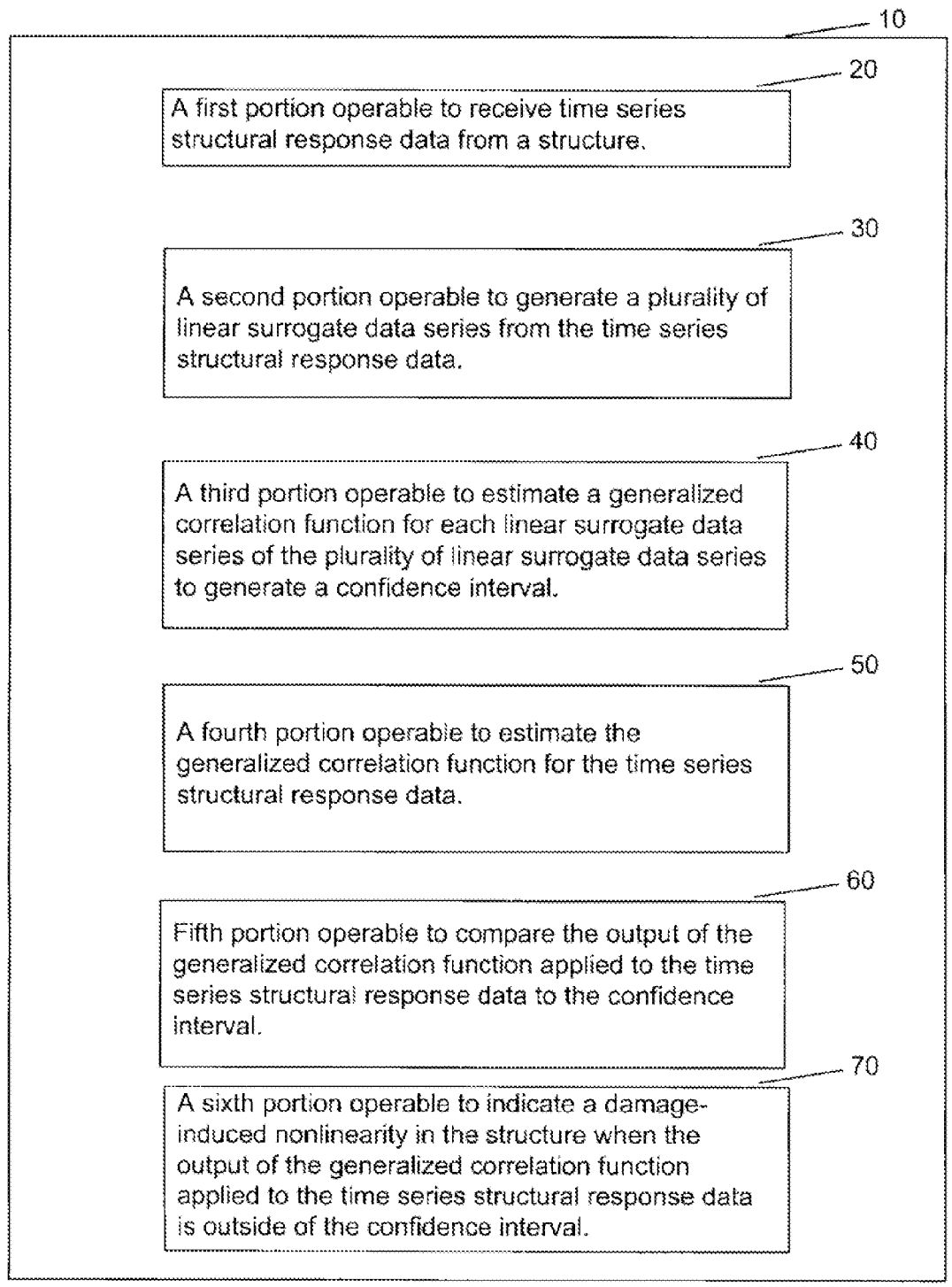
FIG. 2 is a block diagram of an apparatus according to an embodiment of the invention.

Another embodiment of the invention, shown by way of illustration in FIG. 2, includes an apparatus 10. The apparatus includes a first portion 20 operable to receive time series structural response data from a structure. The apparatus includes a second portion 30 operable to generate a plurality of linear surrogate data series from the time series structural response data. The apparatus includes a third portion 40 operable to estimate a generalized correlation function for each linear surrogate data series of the plurality of linear surrogate data series to generate a confidence interval. The apparatus includes a fourth portion 50 operable to estimate the generalized correlation function for the times series structural response data. The apparatus includes a fifth portion 60 operable to compare the output of the generalized correlation function applied to the structural response data to the confidence interval. The apparatus includes a sixth portion 70 operable to indicate a damage-induced nonlinearity in the structure when the output of the generalized correlation function applied to the original structural response data is outside of the confidence interval. Optionally, the generalized correlation function includes a time-delayed transfer entropy function, a bispectrum, a nonlinear prediction error function, or a time-delayed mutual information function. Optionally, the second portion 30 is operable to phase randomize the original structural response data and preserving linear auto-correlations, linear cross-correlations, and/or amplitude distribution.

According to another embodiment of the invention, damage in structures is modeled as the introduction of a non-linearity into a structure or component thereof that is otherwise in a healthy (or unimpaired) state able to be represented by a linear model. Examples of such damage include the presence of a crack (e.g., bi-linear stiffness), post-buckled behavior (e.g., Duffing nonlinearity), and/or bolt rattling (e.g., impacting system with discontinuities).

An embodiment of the invention addresses at least two metrics for discerning the presence of a structural nonlinearity: time-delayed mutual information and time-delayed transfer entropy. The higher-order correlations associated with nonlinearity are accounted for naturally if one defines coupling in terms of the signal's probability density functions. Both the time-delayed mutual information function and the time-delayed transfer entropy employ probabilistic definitions of coupling. Each metric answers a different question about the relationship between two or more times series. Although the description of various embodiments discusses two time series, it is readily appreciated that alternative embodiments of the invention optionally includes as many variables as deemed necessary for a given damage-detection application.

Monitoring a structure by recording its response at K separate locations for N discrete points in time results in the multivariate time series $x(n) \equiv x_i(n)$, $i=1 \ldots K$, $n=1 \ldots N$ (boldface type being to denote a vector). Each observation in time-series i has associated with it an underlying probability density function $p(x_i(n))$ which returns the probability of observing the value $x_i(n)$. The joint density for data recorded from spatial locations i and j is similarly given by $p(x_i(n), x_j(n))$. Unless otherwise indicated herewith, stationarity is assumed such that $p(x_i(n))=p(x_i(n+T))$. Unless multiple realizations of the structure response can be obtained, this assumption will become necessary when estimating probabilities as discussed below. The assumption of stationarity allows dropping the absolute time index n when writing the densities, i.e., $p(x_i) \equiv p(x_i(n))$.

Useful to this approach to nonlinearity detection is the formation of what amounts to a null hypothesis and then mapping differences between observed and hypothesized behavior to a scalar. The Kullback-Liebler (KL) distance can be formulated as follows:

$$KL(f, g) = \int_{x_i} \int_{x_j} f(x_i, x_j) \log_2 \left( \frac{f(x_i, x_j)}{g(x_i, x_j)} \right) dx_i dx_j$$

between the distributions g(·) and f(·) (by way of example, based two logarithms are used here to place the KL distance in units of bits). These distributions may involve single, joint, or conditional probability densities and are tailored to be specific question being asked.

Instead of computing a measure of linear independence (e.g. the linear cross correlation), the degree of statistical independence between two variables is to be measured. If the processes are statistically independent $p(x_i, x_j)=p(x_i)p(x_j)$, then the joint probability density is the product of the two individual probability densities. In order to quantify the degree of independence one may compute the mutual information $$I(x_i; x_j) = \int \int p(x_i, x_j) \log_2 \left( \frac{p(x_i, x_j)}{p(x_i)p(x_j)} \right) dx_i dx_j \quad (2)$$

which effectively maps this 'distance from independence' to a scalar. This quantity is the KL distance from the assumption of two independent processes. This function allows the practitioner to explore nonlinear correlations in time series data. In order to explore dynamical relationships between $x_i$, $x_j$ a time delay may be added to one of the variables. The time-delayed mutual information, denoted I $(x_i, x_j, T)$, becomes a function of the single and joint densities $p(x_i, x_j(T))$, $p(x_i)$, $p(x_j(T))$ where the notation $p(x_i(n), x_j(n+T))\equiv p(x_i, x_j(T))$ is used (under the assumption of stationarity that only lags or advances need be retained in the notation, not the absolute time index n). Time-delayed mutual information has been used to detect the direction of information flow in neuron firings, in a reaction-diffusion system, and a coupled map lattice. See, e.g., Destexhe A, 1994 Oscillations, complex spatiotemporal behavior, and information transport in networks of excitatory and inhibitory neurons, Physical Review E, vol. 50, pp. 1594-1606, incorporated herein by reference; Vastano et al., 1988 Information transport in spatiotemporal systems, Physical Review Letters, vol. 60, pp. 1773-1776, incorporated herein by reference; and Ho, M. C. et al., 2003 Information flow and nontrivial collective behavior in chaotic-coupled map lattices, Physical Review E, vol. 60, 056214, incorporated herein by reference. Here it will simply be used to capture nonlinear correlations among the data.

Expanding the argument of the logarithm, equation (2) is re-written as $$I(x_i; x_j, T) = \int \int p(x_i, x_j(T)) \log_2(p(x_i, x_j(T))) dx_i dx_j(T) - \int p(x_i) \log_2(p(x_i)) dx_i - \int p(x_j(T)) \log_2(p(x_j(T))) dx_j(T) \quad (3)$$

Each of the three individual terms in the above equation represents the Shannon entropy associated with the various probability densities. This particular form most easily lends itself to computational treatment as will be shown below.

The transfer entropy is another metric for quantifying dynamical relationships among time series data. See, e.g., Schreiber T, 2000 Measuring information transfer, Physical Review Letters, vol. 85, p. 461, incorporated herein by reference; and Kaiser, A, et al., 2002 Information transfer in continuous processes, Physica D, vol. 166, pp. 43-62, incorporated herein by reference. Unlike mutual information, the transfer entropy is designed to account for transition probabilities (e.g., dynamics) directly and hence does not require the use of a time delay to detect asymmetric coupling (e.g., mutual information is symmetric in its arguments). The dynamics of $x_i(n)$ are assumed to follow the Markov model $p(x_i(n+1)|x_i(n), x_i(n-1), \ldots, x_i(n-k+1))$. That is, the probability of the system arriving at the value $x_i(n+1)$ is conditional on the previous k values only. Again assuming stationarity, $p(x_i(1)|x_i^{(k)}) \equiv p(x_i(n+1)|x_i(n), x_i(n-1), x_i(n-2), \ldots, x_i(n-k+1))$, wherein only lags or advances need be retained in the notation. If the nature of the relationship between $x_i$ (n), $_j$ (m) is to be understood, it is necessary to determine what information the values $x_j(m)$ carry about the transition probabilities of $x_i(n)$. In other words, it is necessary to determine the possibility that the dynamics $x_i(n+1)$ follow the model $p(x_i(n+1)|x_i(n), x_i(n-1)), \ldots, x_i(n-k+1), p(x_j(m)), x_j(m-1), \ldots, x_j(m-l+1))$ or in shorthand $p(x_i(1) |x_i^{(k)}, x_j^{(l)})$. Here, for example, the dynamics of $x_j(m)$ are modeled as an lth order Markov process. The probability of the process $x_i$ being in a given state at time n+1 is dependent on past history and values of the process $x_j$ at discrete times m, m-1, ..., m-l+1.

The degree to which the values $x_j(n)$ carry information about the transitions (dynamics) of $x_i(n)$ reflects dynamical dependence (as opposed to the statistical dependence captured by mutual information). This definition of interdependence can also be quantified using a form of the KL distance as $$TE(x_i(1) | x_i^{(k)}, x_j^{(l)}) = \int \int \int p(x_i(1), x_i^{(k)}, x_j^{(l)}) \log_2 \left( \frac{p(x_i(1) | x_i^{(k)}, x_j^{(l)})}{p(x_i(1), x_i^{(k)})} \right) dx_i(1) dx_i^{(k)} dx_j^{(l)} \quad (4)$$

Here the distributions f (·) and g(·) of equation (1) involve conditional probabilities. Equation (4) measures the deviation from the assumption that the dynamics of $x_i$ (n) are influenced only by its past history and not the dynamics $x_j$ (n). For simplicity, this embodiment of the invention is restricted to the case of k=l=1 (i.e., first order Markov models). (However, it is understood that alternative embodiments of the invention optionally include second and higher order Markov models). As with mutual information, in this embodiment of the invention, the time delay m=n+T. It is then necessary to determine what information the values of the time series $x_j$ (n+T) carry about the dynamics of $x_i(n)$. In entropy form equation (4) then becomes $$TE(x_i(1) | x_i, x_j(T)) = \int \int \int p(x_i(1), x_i, x_j(T)) \log_2(p(x_i(1), x_i, x_j(T))) dx_i(1) dx_i dx_j(T) + \int p(x_i) \log_2(p(x_i)) dx_i - \int \int p(x_i, x_j(T)) \log_2(p(x_i, x_j(T))) dx_i dx_j(T) - \quad (5)$$

$$\int\int p(x_i(1), x_i)\log_2(p(x_i(1), x_i))dx_i(1)dx_i$$

In the instance that the process $x_j(n+T)$ does not carry added information about eh dynamics $x_i(n)$, the transfer entropy is zero. If the two processes are coupled such that there is some interdependence the transfer entropy rises to some non-zero value. However, if the processes are perfectly coupled, i.e., $x_i(n)=x_j(n)$, for T=0, the transfer entropy is also zero. In an embodiment of the invention, for the purposes of simply detecting the presence of a nonlinear relationship between the time series, this does not pose a problem. In order to simplify the notation, $TE_{j \to i} \equiv TE(x_i(1)|x_i, x_j(T))$.

Computing information theoretics involves the estimation of the various probability densities that comprise equations (3) and (5). In an embodiment of the invention, the data is treated as stationary and ergodic over the time scales on which the measurements are taking place. In an embodiment of the invention, assuming stationarity, an illustrative method of density estimation is performed by sub-dividing the data into bins and estimating the local densities based on the number of points in these bins relative to the total number of points in the time series. For the ith bin we have $\hat{p}(i) \approx M_i/N$ where $M_i$ are the number of points found in that bin. The Shannon entropies are then given by summing over all bins $\Sigma \hat{p}(i) \log_2(p\hat{p}(i))$ In an other embodiment, a more accurate approach to density estimation includes using kernel density estimates about each point. Illustrative estimators include the fixed-bandwidth and fixed-mass kernels. See, e.g., Nichols J. M., et al., 2005 Detecting damaged-induced nonlinearities in structures using information theory, Journal of Sound and Vibration 297, pp. 1-16, 2006 incorporated herein by reference. The local density estimate about a given point with time index n is given by the ratio of number of points in the local region to the volume of the local region. A discussion of density estimation in the context of information theoretics is provided, for example, by Kaiser, A, et al., 2002 Information transfer in continuous processes, Physica D, vol. 166, pp. 43-62, incorporated herein by reference. Because kernel-based methods involve summing over each point in the time series (rather than bins), the entropy for the process $x(n)$ may be written as follows:

$$\int p(x(n))\log_2(p(x(n)))dx \approx \frac{1}{N}\sum_n \log_2(\hat{p}(x(n))) \quad (6)$$

wherein ^ denotes the estimated density. See, e.g., Liebert, W. et al., 1989 Proper Choice of the time delay for the analysis of chaotic time series, Physics Letters A, vol. 142, pp. 107-111, incorporated herein by reference; and Prichard D et al., 1995 Generalized redundancies for time series analysis, Physica D, vol. 84, pp. 476-493, incorporated herein by reference. Substituting equation (6) into equations (3) and (5) then gives estimates of both the mutual information and transfer entropy.

Testing for the presence of nonlinearity requires an alternative, or null hypothesis. A logical choice of null hypothesis is to assume that a linear model is sufficient to capture the relationship between the time series of interest. Statistically significant deviations from this hypothesis are considered suggestive that the underlying dynamics are indeed nonlinear. Surrogate times series are designed to preserve certain properties of the original data (i.e., the properties against which are being tested), but are random with respect to others (i.e., the properties for which are being tested). See, e.g., Theiler J. et al., 1992 Testing for nonlinearity in time series: the method of surrogate data, Physica D, vol. 58, pp. 77-94, incorporated herein by reference; Palus M., 1995 Testing for nonlinearity using redundancies: quantitative and qualitative aspects, Physica D, vol. 80, pp. 186-205, incorporated herein by reference; Palus M., 1996 Detecting nonlinearity in multivariate time series, Physics Letters A, vol. 213, pp. 138-147, incorporated herein by reference; and Schreiber T., 1996 Improved surrogate data for nonlinearity tests, Physical Review Letters, vol. 77, pp. 635-638, incorporated herein by reference. In an embodiment of the invention, surrogates are constructed such that they preserve the linear auto- and cross correlations in the data, but are random with respect to all other correlations. Applying the proposed algorithms to the original data and surrogates therefore produces no difference if a linear model is indeed adequate. However, the presence of nonlinearity produces higher-order correlations not present in the surrogates; such a presence is reflected in both the mutual information and transfer entropy.

If the data are Gaussian, linear surrogates are constructed for the multivariate time series $x_k(n)$, k=1, ..., K. See, e.g., Prichard D. et al., 1994 Generating surrogate data for time series with several simultaneously measured variables, Physical Review Letters, vol. 73, pp. 951-954, incorporated herein by reference. If $X_i(f), X_j(f)$ denote the discrete, complex Fourier transforms of $x_i(n)$, $x_j(n)$, where i, j,K, the cross-spectral density may be written in terms of magnitude and phase as $$S_{x_i x_j}(f) = X_i(f) X_j(f) = |X_i(f)||X_j(f)|e^{i(\phi_i(f)-\phi_j(f))}$$

By the Weiner-Khitchine relationship, the linear cross-correlation associated with $x_i(n)$, $x_j(n)$ is simply the inverse Fourier transform of $S_{x_i x_j}(f)$. Thus, the linear auto- and cross-correlations are preserved if a random phase $\psi(f) \in (0, 2\pi)$ is added to both $\phi_i(f)$, $\phi_j(f)$. The general algorithm for creating surrogate data sets for K times series is therefore to compute $\hat{x}_k(n)=F_{-1}\{X_k(f)e^{i\psi}\}_i$ k=1, ..., K. The resulting times series exactly matches the linear correlations in the original data. Randomizing the phases destroys higher-order correlations.

For non-Gaussian data, another algorithm is applied in order to preserve the amplitude distributions of the underlying time series. For example, an iterative algorithm is used, whereby the original time series are continually re-shuffled (phase randomized) in such a way as to preserve the linear correlations in the data as before. See, e.g., Schreiber T., 1996 Improved surrogate data for nonlinearity tests, Physical Review Letters, vol. 77, pp. 635-638, incorporated herein by reference. However, because the surrogates are shuffled versions of the original time series, the amplitude distributions are automatically preserved.

Applying the mutual information and transfer entropy algorithms to the data and the surrogates produce statistically similar results, if the system dynamics $x_i(n)$ are linear. Differences between the metrics computed from the $x_i(n)$, ^ $x_j(n)$ are assumed to be indicative of nonlinearity. Depending on the level of confidence desired in the result, as alternative embodiment of the invention include as few or as many surrogate data sets as necessary.

In another embodiment of the invention, alternative kernel density estimation techniques are used for estimating the probability densities of the time-delayed mutual information metric and/or the time-delayed transfer entropy metric. For example, other embodiments of the invention include a bispectrum and/or a nonlinear prediction error function.

A host of other kernels exist that make use of multi-dimensional "smoothing" functions to aid in the estimate. Illustrative kernels include Parzen windowing (Gaussian kernel), Epanechnikov kernels, triangular kernels, cosine kernels, etc. A comprehensive discussion is given in B. W. Silverman, "Density Estimation for Statistics and Data analysis", Chapman Hall, 1986", incorporated herein by reference.

It is understood that an embodiment of the invention includes a software program stored on a computer-readable medium and embodying a method according to the invention, as described above.

Obviously, many modifications and variations of the present invention are possible in light of the above teachings without departing from the true scope and spirit of the invention. It is therefore to be understood that the scope of the invention should be determined by referring to the following appended claims.

What is claimed is:

1. A method comprising:
providing original structural response data from a structure;
generating surrogate data including a plurality of linear statistical properties of the original structural response data;
computing a plurality of time-delayed transfer entropies from the original structural response data and a plurality of time-delayed transfer entropies from the surrogate data; and
identifying a damage-induced non-linearity in the structure from a difference between the plurality of time-delayed transfer entropies from the original structural response data and the plurality of time-delayed transfer entropies from the surrogate data.

2. The method according to claim 1, wherein said generating comprises phase randomizing the original structural response data and preserving at least one of linear auto-correlations, linear cross-correlations, and amplitude distribution.

3. A method comprising:
providing time series structural response data from a structure;
generating a plurality of linear surrogate data series from the time series structural response data;
estimating a generalized correlation function for each linear surrogate data series of the plurality of linear surrogate data series to generate a confidence interval;
estimating the generalized correlation function for the time series structural response data, thereby generating an output of the generalized correlation function applied to the structural response data;
comparing the output of the generalized correlation function applied to the structural response data to the confidence interval;
indicating a damage-induced nonlinearity in the structure when the output of the generalized correlation function applied to the structural response data is outside of the confidence interval.

4. The method according to claim 3, wherein the generalized correlation function includes one of a time-delayed transfer entropy function, a bispectrum, a nonlinear prediction error function, and a time-delayed mutual information function.

5. The method according to claim 3, wherein said generating comprises phase randomizing the original structural response data and preserving at least one of linear auto-correlations, linear cross-correlations, and amplitude distribution.

6. An apparatus comprising:
a first portion operable to receive time series structural response data from a structure;
a second portion operable to generate a plurality of linear surrogate data series from the time series structural response data;
a third portion operable to estimate a generalized correlation function for each linear surrogate data series of the plurality of linear surrogate data series to generate a confidence interval;
a fourth portion operable to estimate the generalized correlation function for the time series structural response data and to generate an output of the generalized correlation function applied to the structural response data;
a fifth portion operable to compare the output of the generalized correlation function applied to the structural response data to the confidence interval;
a sixth portion operable to indicate a damage-induced nonlinearity in the structure when the output of the generalized correlation function applied to the structural response data is outside of the confidence interval.

7. The apparatus according to claim 6, wherein the generalized correlation function includes one of a time-delayed transfer entropy function, a bispectrum, a nonlinear prediction error function, and a time-delayed mutual information function.

8. The apparatus according to claim 6, wherein said second portion is operable to phase randomize the original structural response data and preserving at least one of linear auto-correlations, linear cross-correlations, and amplitude distribution.

* * * * *